(12) United States Patent
Sawada (10) Patent No.: US 7,538,912 B2
(45) Date of Patent: May 26, 2009

(54) IMAGE READING APPARATUS AND CIRCUIT BOARD UNIT USED THEREFOR

(75) Inventor: Hideki Sawada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 232 days.

(21) Appl. No.: 10/537,729

(22) PCT Filed: Dec. 9, 2003

(86) PCT No.: PCT/JP03/15750

§ 371 (c)(1),
(2), (4) Date: Jun. 7, 2005

(87) PCT Pub. No.: WO2004/054231

PCT Pub. Date: Jun. 24, 2004

(65) Prior Publication Data

US 2006/0081763 A1    Apr. 20, 2006

(30) Foreign Application Priority Data

Dec. 9, 2002    (JP) .............................. 2002-356958

(51) Int. Cl.
H04N 1/04    (2006.01)
(52) U.S. Cl. .................. 358/483; 358/482; 358/484; 358/475; 358/496
(58) Field of Classification Search .................. 358/483, 358/482, 512–514, 474, 497, 505, 471, 484, 358/475, 496; 250/208.1, 234–236, 239, 250/216; 257/784, 678, 680, 724, 730
See application file for complete search history.

(56) References Cited

U.S. PATENT DOCUMENTS 6,002,494 A * 12/1999 Tabata ......................... 358/475
6,357,903 B1 * 3/2002 Furusawa et al. ............ 362/555
6,512,603 B2 * 1/2003 Saito ........................... 358/509
6,864,999 B1 * 3/2005 Fujimoto et al. ............. 358/472
6,947,184 B1 * 9/2005 Onishi et al. ................. 358/472
7,167,284 B2 * 1/2007 Sawada ....................... 358/483
2002/0003580 A1    1/2002 Yoshida
2002/0017600 A1    2/2002 Ikeda
2002/0051239 A1    5/2002 Fukumoto et al.

(Continued)

FOREIGN PATENT DOCUMENTS

JP    11-136438    5/1999

(Continued)

Primary Examiner—Cheukfan Lee
(74) Attorney, Agent, or Firm—Hamre, Schumann, Mueller & Larson, P.C.

(57) ABSTRACT

An image reading apparatus (X) includes a light source, a case (2) for accommodating the light source, and a substrate (8) mounted to the case (8). A plurality of sensor IC chips (7) for detecting the light traveling from an image reading region are mounted on the substrate (8). The sensor IC chips (7) are arranged at positions closer to a second side edge (8b) than to a first side edge (8a) of the substrate. A predetermined wiring pattern is formed on the substrate (8). The sensor IC chips (7) are electrically connected to the wiring pattern via wires (W). The wires (W) are connected to the wiring pattern by extending from the upper surface of the sensor IC chips (7) toward the first side edge (8a) of the substrate.

7 Claims, 6 Drawing Sheets

U.S. PATENT DOCUMENTS

2002/0135824 A1  9/2002  Saito

FOREIGN PATENT DOCUMENTS

| | | |
|---|---|---|
| JP | 2000-125080 | 4/2000 |
| JP | 2001-53930 | 2/2001 |
| JP | 2001-339574 | 12/2001 |
| JP | 2001-358906 | 12/2001 |
| JP | 2002-51189 | 2/2002 |

* cited by examiner

IMAGE READING APPARATUS AND CIRCUIT BOARD UNIT USED THEREFOR

TECHNICAL FIELD

The present invention relates to an image reading apparatus used for reading an image printed on a document, for example. The present invention also relates to a circuit board unit used for manufacturing an image reading apparatus.

BACKGROUND ART

Figure 6:
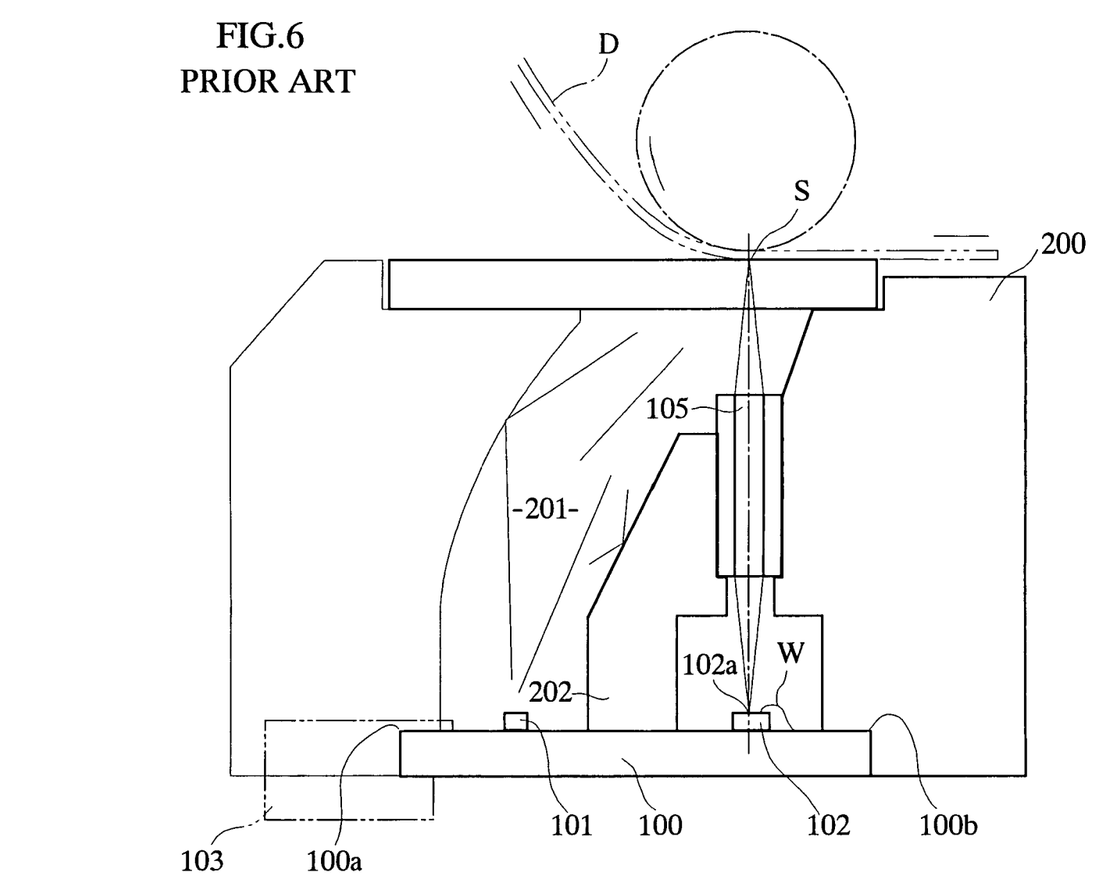
FIG. 6 is a sectional view showing the structure of a prior-art image reading apparatus.

FIG. 6 of the present application shows an example of prior-art image reading apparatus. The illustrated image reading apparatus includes a substrate 100, and a case 200 to which the substrate is mounted. The substrate has a rectangular configuration elongated in a direction perpendicular to the sheet surface of the figure. The substrate 100 has an upper surface on which a plurality of light sources 101 and a plurality of sensor IC chips 102 are mounted. The light sources 101 are aligned along a first side edge 100a of the substrate 100 with predetermined intervals. The sensor IC chips 102 aligned along a second side edge 100b of the substrate 100. Each of the sensor IC chips 102 has an upper surface formed with a light receiving portion 102a.

The case 200 is formed with a light path 201 for guiding the light emitted from the light sources 101 to an image reading region S. A lens array comprising a plurality of lenses 105 is disposed below the image reading region S. The light reflected by the image reading region S is converged by the lenses 105 and received by the light receiving portion 102a of each sensor IC chip 102.

Each sensor IC chip 102 has the photoelectric conversion function and outputs an image signal of the level corresponding to the received amount of light. To obtain an image signal faithful to the object to be read, the light emitted from the light sources 101 need be prevented from directly reaching the light receiving portion 102a. For this purpose, a partition wall 202 is provided between the light sources 101 and the sensor IC chips 102. The partition wall 202 engages the upper surface of the substrate 100 and extends in the longitudinal direction of the substrate 100.

As indicated by double-dashed lines in FIG. 6, a connector 103 for external connection is attached to the substrate 100. The connector 103 is connected to a wiring pattern (not shown) formed on the upper surface of the substrate 100. The wiring pattern is connected to the light sources 101 and the sensor IC chips 102. Such an image reading apparatus is disclosed in JP-A 2001-339574, for example.

In the image reading apparatus of FIG. 6, the wiring pattern is connected to each IC chip 102 via a wire W. Specifically, the upper end of the wire W is connected to the IC chip 102, whereas the lower end of the wire is connected to the wiring pattern.

The prior-art structure has the following drawbacks. As shown in FIG. 6, the lower end of the wire W is connected to the wiring pattern on the right side of the chip 102 (adjacent the second side edge 100b). With such an arrangement, in mounting the substrate 100 to the case 200, the operator's hand or the case 200 is likely to come into contact with the wire W. When such contact occurs, the wire W may be broken or the connection between the wire W and the chip 102 or the wiring pattern may fail.

DISCLOSURE OF THE INVENTION

The present invention is conceived under such circumstances. It is, therefore, an object of the present invention to provide an image reading apparatus in which improper external force is not exerted to the wires connecting the wiring pattern and the sensor IC chips on the substrate to each other. Another object of the present invention is to provide a circuit board unit used for manufacturing such an image reading apparatus.

According to a first aspect of the present invention, there is provided an image reading apparatus comprising: a light source for illuminating an image reading region extending in a primary scanning direction; a case for accommodating the light source; a substrate including a first side edge and a second side edge spaced from each other in a secondary scanning direction which is perpendicular to the primary scanning direction, the substrate being mounted to the case; a plurality of sensor IC chips for detecting light traveling from the image reading region, the sensor IC chips being mounted on a principal surface of the substrate at positions closer to the second side edge than to the first side edge; a wiring pattern formed on the substrate; and a plurality of wires electrically connecting the sensor IC chips and the wiring pattern to each other. Each of the wires is connected to the wiring pattern by extending from a corresponding one of the sensor IC chips toward the first side edge of the substrate.

Preferably, the image reading apparatus of the present invention further comprises a light guide for guiding the light emitted from the light source to the image reading region. The case is provided with a partition wall for separating the light guide and the sensor IC chips, and the partition wall is spaced from the substrate.

Preferably, the light guide is made of transparent resin.

Preferably, the partition wall includes a flat surface extending parallel to the principal surface of the substrate, and the wires enter between the flat surface and the principal surface of the substrate at least partially.

Preferably, the image reading apparatus of the present invention further comprises a reflector held in contact with the light guide to prevent light from leaking from the light guide. The reflector is provided on the partition wall.

Preferably, the plurality of sensor IC chips are arranged in a straight row. The wiring pattern includes a conductive path which extends across the row of the sensor IC chips and a conductive path which does not extend across the row of the sensor IC chips.

Preferably, each of the sensor IC chips is provided with a plurality of connection pads, and a plurality of light receiving portions arranged in a straight row. The connection pads are arranged at positions offset toward the first side edge of the substrate with respect to the light receiving portions.

Preferably, the image reading apparatus of the present invention further comprises a connector for external connection attached to the first side edge of the substrate. The connector is electrically connected to the wiring pattern.

According to a second aspect of the present invention, there is provided a circuit board unit comprising: a substrate including a first side edge and a second side edge spaced from each other; a plurality of sensor IC chips mounted on the substrate at positions closer to the second edge than to the first edge; a wiring pattern formed on the substrate; and a plurality of wires electrically connecting the sensor IC chips and the wiring pattern to each other. Each of the wires is connected to the wiring pattern by extending from a corresponding one of the sensor IC chips toward the first side edge of the substrate.

Preferably, each of the sensor IC chips is provided with a plurality of connection pads, and a plurality of light receiving portions arranged in a straight row. The connection pads are arranged at positions offset toward the first side edge of the substrate with respect to the light receiving portions.

BEST MODE FOR CARRYING OUT THE INVENTION

Preferred embodiments of the present invention will be described below in detail with reference to the accompanying drawings.

FIGS. 1 through 4 show an example of image reading apparatus according to the present invention. As will be understood from FIG. 1, the image reading apparatus X includes a case 2, a light guide 3, a reflector 4, a transparent plate 5, a lens array 6 and a circuit board unit U. The unit U includes a rectangular substrate 8 elongated in the primary scanning direction (See the arrow A in FIG. 1), and various elements (which will be described later) provided on the substrate.

Figure 1:
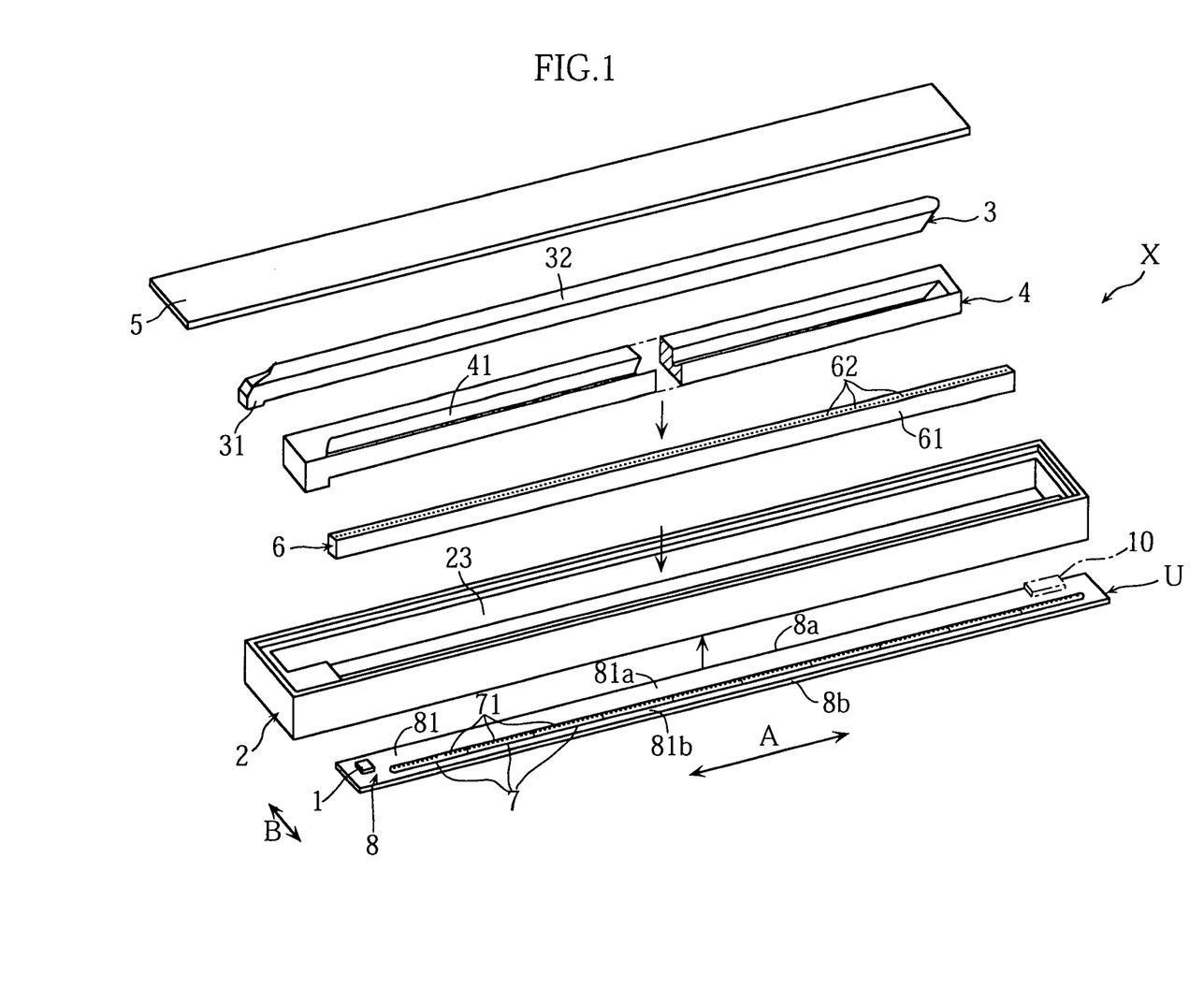
FIG. 1 is an exploded perspective view showing main structural parts of an image reading apparatus according to the present invention.

The substrate 8 has a principal surface (upper surface) 81 on which a light source unit 1 and a plurality of sensor IC chips 7 are mounted. The substrate 8 includes two side edges extending in the primary scanning direction, i.e., a first side edge 8a and a second side edge 8b.

Figure 3:
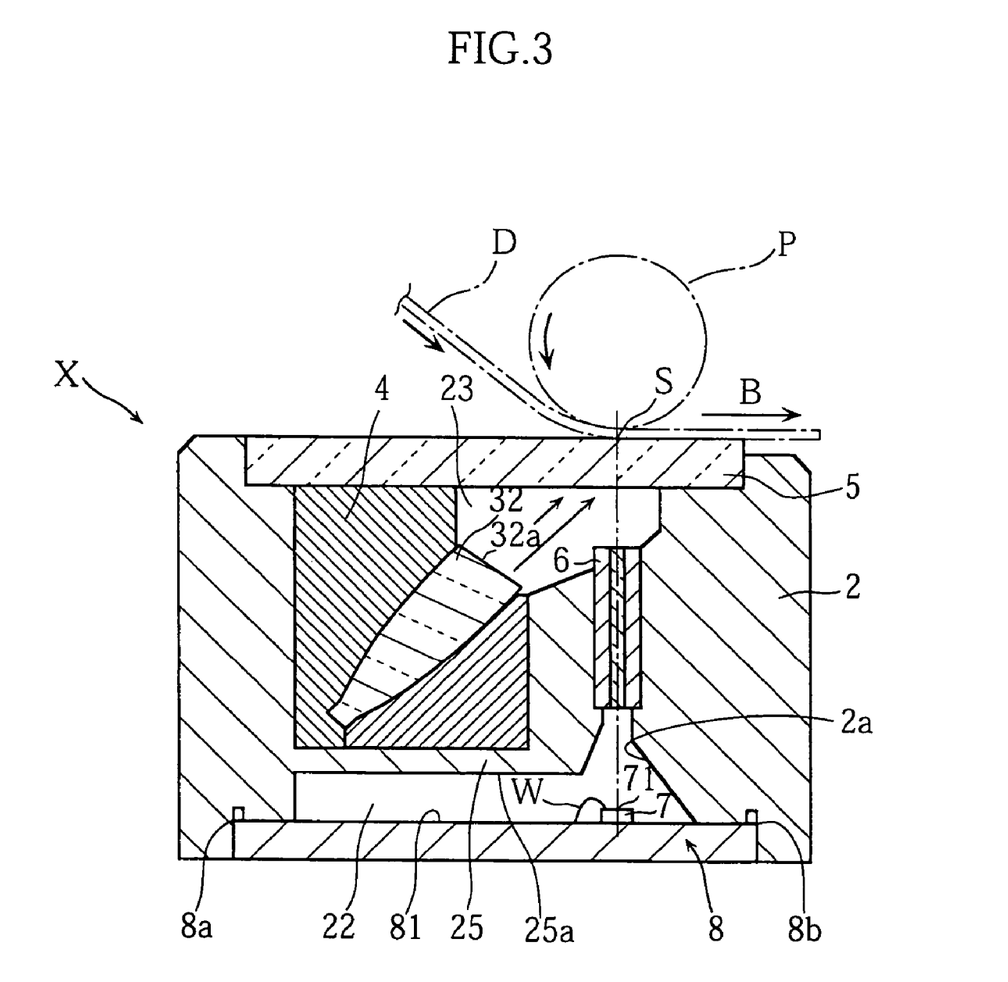
FIG. 3 is a sectional view taken along lines III-III in FIG. 2.
Figure 4:
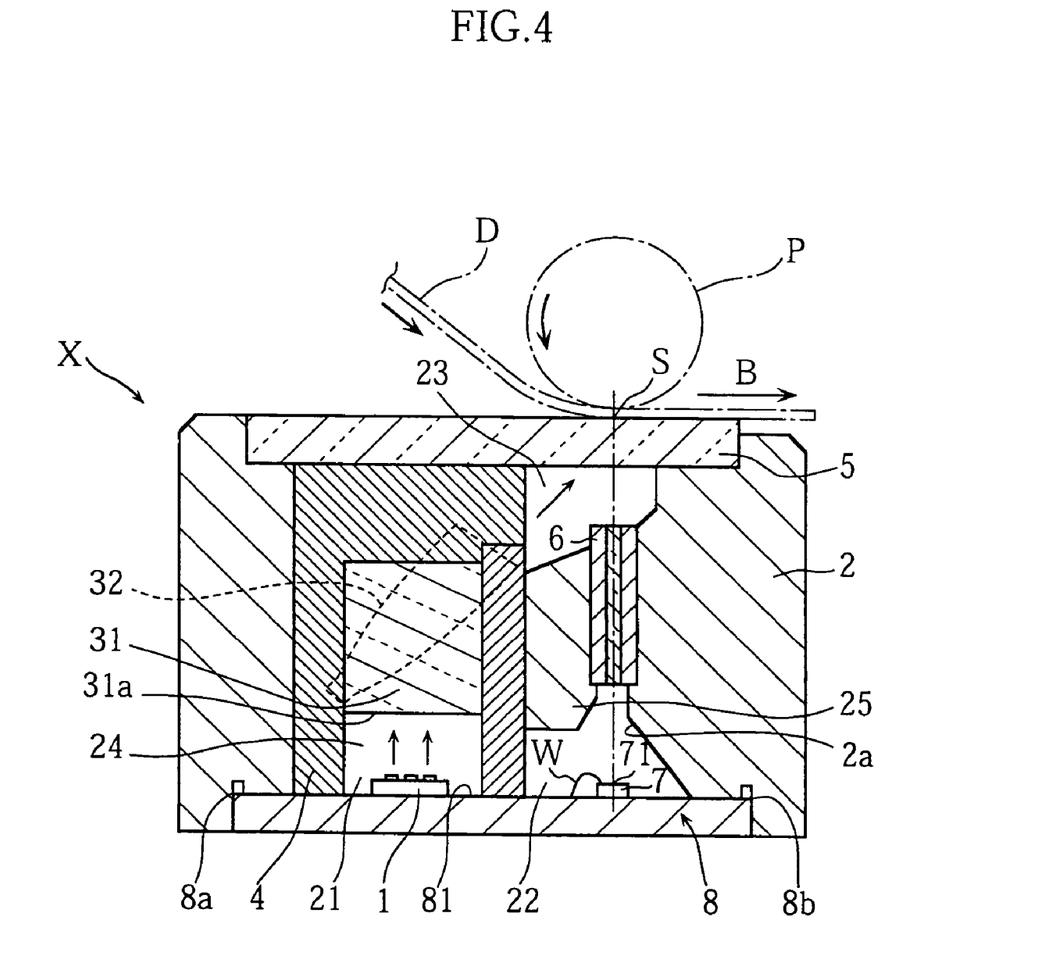
FIG. 4 is a sectional view take along lines IV-IV in FIG. 2.

The light source unit 1 serves to illuminate an image reading region S (See FIG. 3). In the illustrated example, the light source unit 1 comprises three kinds of light emitting diodes, i.e., a red diode, a green diode and a blue diode (See FIG. 4). As shown in FIG. 1, the light source unit 1 is provided at an end of the substrate 8. Further, as shown in FIG. 4, the light source unit 4 is close to the first side edge 8a than to the second side edge 8b.

Figure 2:
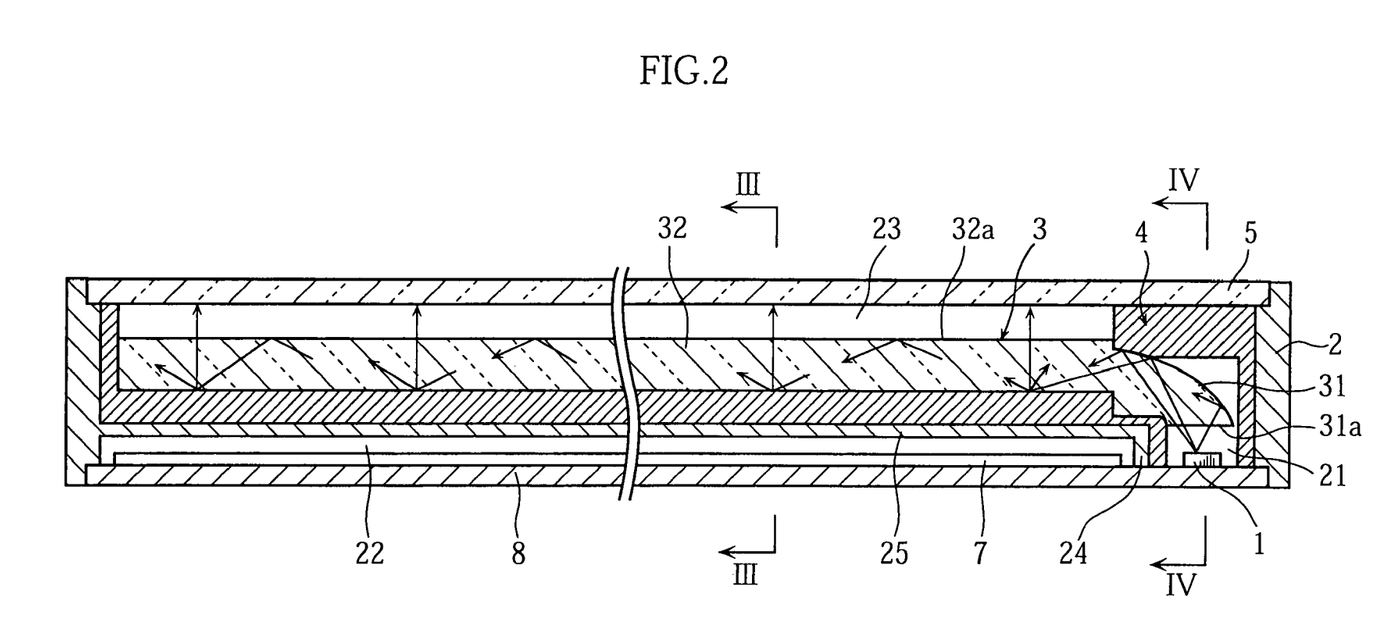
FIG. 2 is a sectional view showing the state in which the main structural parts are assembled together.

The case 2 is made of a synthetic resin and has a lower surface on which the substrate 8 is mounted. As shown in FIG. 2, the case 2 includes a first space 21 for accommodating the light source unit 1. As shown in FIGS. 2-4, the case 2 further includes a second space 22 for accommodating the sensor IC chips 7, and a third space 23 for accommodating the light guide 3 and the reflector 4. The first space 21 and the second space 22 are separated by a first partition wall 24 of the case 2 (See FIG. 2). The second space 22 and the third space 23 are separated by a second partition wall 25 (See FIGS. 2 and 3). The second partition wall 25 is spaced from the substrate 8 and provided above the substrate. The first and the second partition walls 24 and 25 are provided to block the light directly traveling toward the sensor IC chips 7 from the light source unit 1. As shown in FIG. 3, the second partition wall 25 has a flat surface 25a extending parallel to the principal surface 81 of the substrate 8. The wire W enters between the flat surface 25a and the principal surface 81 of the substrate 8 at least partially.

The light guide 3 is transparent and may be made of polymethyl methacrylate (PMMA), for example. As shown in FIG. 2, the light guide 3 extends in the longitudinal direction of the case 2 and includes an auxiliary portion 31 and a main portion 32. The auxiliary portion 31 has a light incident surface 31a facing the light source unit 1. The light impinging on the light incident surface 31a travels through the auxiliary portion 31 to enter the main portion 32. As shown in the figure, the light traveling through the main portion 32 is totally reflected by the surfaces of the main portion 32. The lower surface of the main portion 32 is formed with a plurality of recesses (not shown) arranged with predetermined intervals. The light traveling through the main portion 21 is scattered and reflected by the recesses and partially emitted toward the image reading region S through a light emission surface 32a (See FIG. 3). The image reading region S is irradiated with the emitted light.

The reflector 4 is made of a synthetic resin and is made white to increase the light reflectance. The reflector 4 includes an accommodation portion 41 for accommodating the light guide 3. The reflector 4 covers the light guide 3 except the light incident surface 31a and the light emission surface 32a to prevent the waste of light due to leaking from the light guide 3. As shown in FIGS. 2 and 3, the reflector 4 is disposed on the second partition wall 25.

The transparent plate 5 is made of a synthetic resin or glass and mounted on the upper surface of the case 2. The transparent plate 5 comes into contact with the document D which slides thereon by the transfer by the platen roller P in the secondary scanning direction (the direction indicated by the arrow B in FIGS. 3 and 4). The secondary scanning direction is perpendicular to the primary scanning direction.

As shown in FIGS. 3 and 4, the lens array 6 is arranged between the second space 22 and the third space 23 of the case 2. The lens array 6 includes a holder 61 made of a synthetic resin and extending in the primary scanning direction, and a plurality of lenses 62 held by the holder. The above-described image reading region S is located directly above the lenses 62 and on the upper surface of the transparent plate 5.

Figure 5:
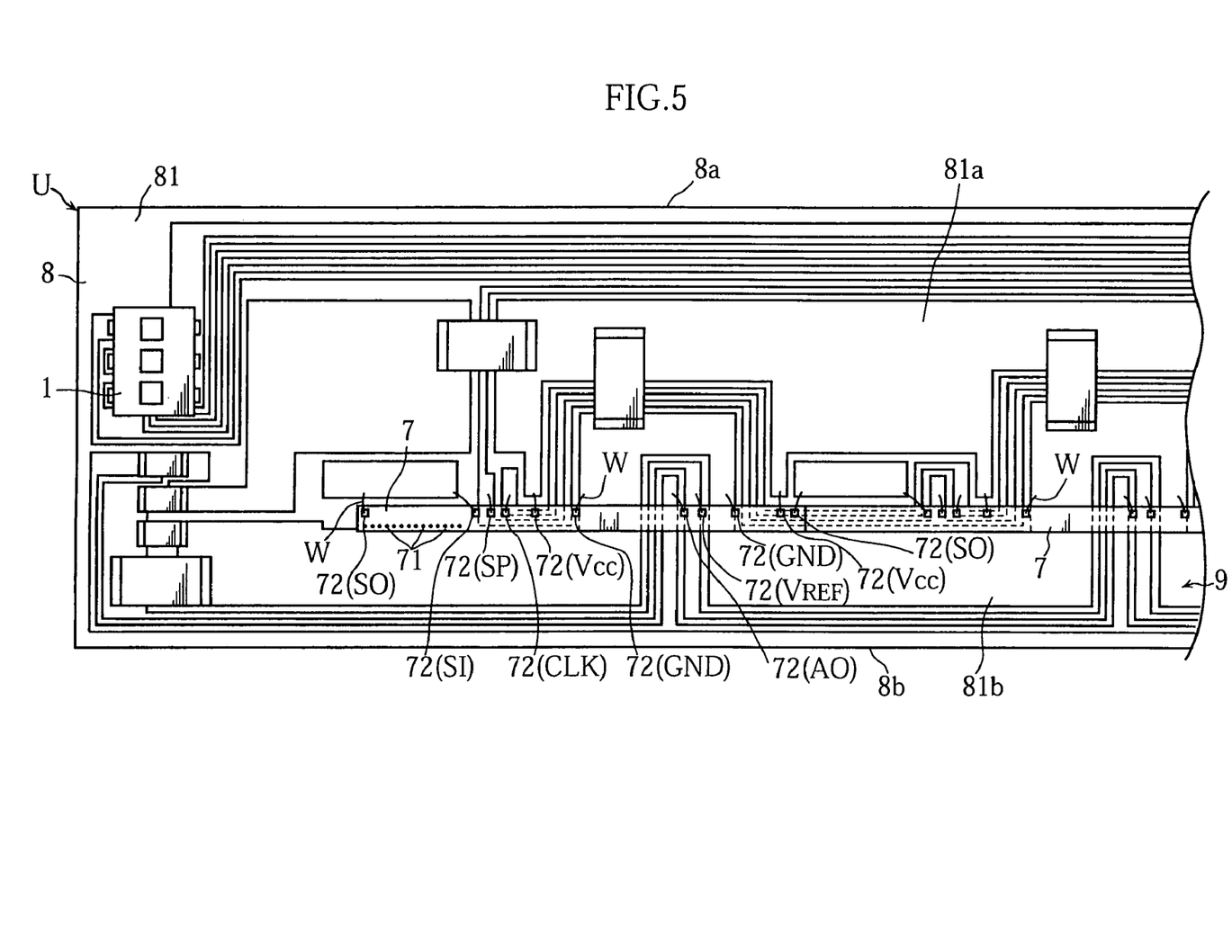
FIG. 5 is a plan view showing a wiring pattern of a circuit board unit according to the present invention.

As shown in FIG. 5, each of the sensor IC chips 7 comprises an elongated rectangular semiconductor device. The plurality of sensor IC chips 7 are aligned in the longitudinal direction of the substrate 8. The sensor IC chips 7 are located closer to the second side edge 8b than to the first side edge 8a. Therefore, with the sensor IC chips 7 serving as the boundary, the upper surface 81 of the substrate 8 is partitioned into two regions of different widths, i.e., a first region 81a and a second region 81b. As will be understood from the figure, the first region 81a is located on the side of the first side edge 8a of the substrate and is larger in area (width) than the second region 81b (located on the side of the second side edge 8b).

Each of the sensor IC chips 7 has a plurality of light receiving portions 71. The light receiving portions receive light passed through the lens array 6. The sensor IC chip 7 has the photoelectric conversion function and outputs an image signal of an output level corresponding to the received amount of light.

As shown in FIG. 5, a plurality of conductive pads 72 are provided on the upper surface of the sensor IC chip 7. The pads 72 are arranged at positions offset toward the first side edge 8a with respect to the center of the sensor IC chip 7 in the width direction (vertical direction in FIG. 5). These pads 72 include pads 72 (Vcc, VREF) for voltage application, a pad 72 (GND) for ground connection and pads 72 (CLK, SI, SP, AO, SO) for inputting or outputting various kinds of signals. In the sensor IC chip 7, when a serial-in-signal is inputted into the pad 72 (SI), the charge stored in the light receiving portions 71 is discharged. The discharged charge is serially outputted from the pad 72 (AO).

The substrate 8 is made of e.g. a ceramic material, and a connector 10 for external connection is attached to the first side edge 8a (See FIG. 1). The connector 10 is electrically connected to the light source unit 1 and the sensor IC chips 7 through a wiring pattern 9. The wiring pattern 9 comprises a plurality of conductive paths corresponding to the pads 72. Each of the conductive paths is connected to the corresponding pad 72 via a wire W. The upper end of each wire W is connected to the corresponding pad, whereas the lower end of the wire is connected to the corresponding conductive path. The connection point between the lower end of the wire W and the conductive path is located in the first region 81a. Thus, all the wires S are connected to the wiring pattern 9 by extending from the corresponding pads 72 toward the first side edge 8a. The conductive paths for the pads 72 (GND, AO, VREF) extend in both of the first region 81a and the second region 81b. Therefore, the conductive paths for the pads GND, AO and VREF extend across the chip 7 below the sensor IC chip 7. The conductive paths for other pads 72 (Vcc, CLK, SI, SP, SO) are provided in the first region 81a and do not extend into the second region 81b. (Although these conductive paths are partially located below the chip 7, the paths do not extend into the second region 81b.)

As described above, in the image reading apparatus X of the present invention, the wires W extend from the sensor IC chip 7 toward the first side edge 8a. Therefore, in mounting the substrate 8 to the case 2, the operator's hand does not come into contact with the wires W. Further, as shown in FIG. 3, the second partition wall 25 of the case 2 is spaced from the substrate 1 and provided above the substrate, so that the contact between the wires W and the case 2 can be avoided. With such a structure, the prior-art problems such as the breakage of wires W or the connection failure can be solved. Moreover, in the example shown in FIG. 3, the case 2 includes an inclined wall surface 2a facing the sensor IC chips 7. The wall surface 2a extends in a direction perpendicular to the sheet surface of the figure. With such an arrangement, the contact between the case 2 and the chips 7 can be avoided.

Further, in the image reading apparatus X, the wires W extend from the sensor IC chip 7 to the side of the first side edge 8a and connected to the wiring pattern 9 in the first region 81a. With such a structure, at least part of the conductive paths connected to the sensor IC chip 7 is only required to be formed at the first region 81a. As a result, the structure of the wiring pattern 9 can be made simpler than the prior-art wiring pattern, whereby the manufacturing cost can be reduced.

The present invention being thus described, it is apparent that the same may be varied in many ways. Such variations should not be regarded as a departure from the spirit and scope of the present invention, and all such modifications as would be obvious to those skilled in the art are intended to be included within the scope of the following claims.

The invention claimed is:

1. An image reading apparatus comprising:
    a light source for illuminating an image reading region extending in a primary scanning direction;
    a case for accommodating the light source;
    a substrate including a first side edge and a second side edge spaced from each other in a secondary scanning direction which is perpendicular to the primary scanning direction, the substrate being elongated in the primary scanning direction and mounted to the case;
    a plurality of sensor IC chips for detecting light traveling from the image reading region, the sensor IC chips being mounted on a principal surface of the substrate at positions closer to the second side edge than to the first side edge;
    a wiring pattern formed on the substrate;
    a plurality of wires electrically connecting the sensor IC chips and the wiring pattern to each other;
    a light guide for guiding light emitted from the light source to the image reading region; and
    a reflector held in contact with the light guide to prevent light from leaking from the light guide;
    wherein each of the wires is connected to the wiring pattern by extending from a corresponding one of the sensor IC chips toward the first side edge of the substrate,
    the light source is mounted on an end of the principal surface of the substrate in the primary scanning direction,
    the case is provided with a first partition wall for separating the light source and the sensor IC chips and with a second partition wall for separating the light guide and the sensor IC chips,
    the first partition wall is held in contact with the principal surface of the substrate, and
    the second partition wall is spaced from the substrate, and the reflector is provided on the second partition wall.

2. The apparatus according to claim 1, wherein the light guide is made of transparent resin.

3. The apparatus according to claim 1, wherein the second partition wall includes a flat surface extending parallel to the principal surface of the substrate, and wherein the wires enter between the flat surface and the principal surface of the substrate at least partially.

4. The apparatus according to claim 1, wherein the plurality of sensor IC chips are arranged in a straight row, and wherein the wiring pattern includes a conductive path which extends across the row of the sensor IC chips and a conductive path which does not extend across the row of the sensor IC chips.

5. The apparatus according to claim 1, wherein each of the sensor IC chips is provided with a plurality of connection pads, and a plurality of light receiving portions arranged in a straight row, and wherein the connection pads are arranged at positions offset toward the first side edge of the substrate with respect to the light receiving portions.

6. The apparatus according to claim 1, further comprising a connector for external connection attached to the first side edge of the substrate, wherein the connector is electrically connected to the wiring pattern.

7. The apparatus according to claim 1, wherein the light source comprises a light emitting diode provided on the principal surface of the substrate at a position closer to the first side edge than to the second side edge.

* * * * *